US012621789B2

(12) United States Patent
Alawieh et al.

(10) Patent No.: US 12,621,789 B2
(45) Date of Patent: May 5, 2026

(54) NETWORK ASSISTED POSITION MEASUREMENTS

(71) Applicant: Fraunhofer-Gesellschaft zur Förderung der angewandten Forschung e.V., Munich (DE)

(72) Inventors: Mohammad Alawieh, Erlangen (DE); Ferdinand Kemeth, Erlangen (DE); Norbert Franke, Erlangen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 570 days.

(21) Appl. No.: 17/346,469

(22) Filed: Jun. 14, 2021

(65) Prior Publication Data

US 2021/0345287 A1     Nov. 4, 2021

Related U.S. Application Data

(63) Continuation of application No. PCT/EP2018/085013, filed on Dec. 14, 2018.

(51) Int. Cl.
H04W 64/00 (2009.01)

(52) U.S. Cl.
CPC .................................. H04W 64/00 (2013.01)

(58) Field of Classification Search
None
See application file for complete search history.

(56) References Cited

U.S. PATENT DOCUMENTS

| | | | |
|---|---|---|---|
| 2011/0117925 A1 | 5/2011 | Sampath et al. | |
| 2016/0094324 A1* | 3/2016 | Lee ........................ | H04L 5/0051 |
| | | | 375/267 |
| 2016/0119851 A1* | 4/2016 | Moeglein ............ | H04W 52/285 |
| | | | 455/440 |
| 2016/0242141 A1* | 8/2016 | Lin ........................ | G01S 5/0236 |
| 2017/0208581 A1 | 7/2017 | Yang et al. | |
| 2017/0288897 A1 | 10/2017 | You et al. | |

(Continued)

FOREIGN PATENT DOCUMENTS

| | | |
|---|---|---|
| EP | 2417474 A2 | 2/2012 |
| EP | 2878969 A1 | 6/2015 |
| EP | 3262436 A1 | 1/2018 |

(Continued)

OTHER PUBLICATIONS

Fischer; Introduction to OTDOA on LTE Networks; Aug. 7, 2014; Qualcomm Technologies, pp. 1-18.*

(Continued)

*Primary Examiner* — Adolf Dsouza
(74) *Attorney, Agent, or Firm* — Perkins Coie LLP; Michael A. Glenn

(57) ABSTRACT

A method for determining the position of a target device within a communication network is disclosed. A corresponding target device including a receiving unit and a radio frequency measurement unit, a base station or a location server including a selector and a transmitter, and to a reference device with configurable properties. A system including a base station or a location server, a target device, and a reference device for determining the position of a target device within a communication network are also disclosed.

20 Claims, 12 Drawing Sheets

(56)                References Cited

U.S. PATENT DOCUMENTS

2018/0295600 A1*  10/2018  Kumar .................. H04L 5/0051
2020/0137714 A1*   4/2020  Kumar .................. H04W 72/51

FOREIGN PATENT DOCUMENTS

WO        2010118305 A2    10/2010
WO        2010118305 A3    10/2010
WO        2016130285 A1     8/2016
WO        2016137373 A1     9/2016

OTHER PUBLICATIONS

3GPP TSG-RAN WG2 Meeting #104, Spokane, USA, Nov. 12-16, 2018; Combined Downlink and Uplink NR Positioning Procedures; R2-1817899; Qualcomm Incorporated; pp. 1-18.*
RF—Detector ADL5506 data sheet.
Technical Specification 36.355 3GPP LTE Positioning Protocol (LPP) (Release 13) 3rd Generation Partnership Project. 3rd Generation Partnership Project, 2016.
TS 36.331 V14.8.0 (Sep. 2018).

"3rd Generation Partnership Project; Technical Specification Group Radio Access Network; Evolved Universal Terrestrial Radio Access Network (EUTRAN); Stage 2 functional specification of User Equipment (UE) positioning in E-UTRAN (Release 15)", 3GPP Draft; 36305-F10, 3rd Generation Partnership Project (3GPP), Mobile Competence Centre; 650, Route Des Lucioles; F-06921 Sophia-Antipolis Cedex; France; Oct. 1, 2018 (Oct. 1, 2018), XP051519467.
"Qualcomm Incorporated: "Combined Downlink and Uplink NR Positioning Procedures",", 3GPP Draft; R2-1817899_(Positioning Procedures), 3rd Generation Partnership Project (3GPP), Mobile Competence Centre; 650, Route Des Lucioles; F-06921 Sophia-Antipolis Cedex; France; RAN WG2, Spokane, USA; Nov. 2018.
Fischer, Sven , "Introduction to OTDOA on L TE Networks", Aug. 7, 2014, pp. 1-18, XP055533290, Retrieved from the Internet: URL:https://www.qualcomm.com/media/documents/files/introduction-tootdoa-on-lte-networks-highlights -.pdf [retrieved on Dec. 12, 2018].
"3rd Generation Partnership Project; Technical Specification Group Radio Access Network; Evolved Universal Terrestrial Radio Access (E-UTRA); LTE Positioning Protocol (LPP) (Release 15) 3GPP Draft", DRAFT_36355-F10V2, Sep. 28, 2018, XP 51519444A, Sep. 2018, 217 pp.

* cited by examiner base station
130 reference devices
120 target devices
110 cell
210

100

NETWORK ASSISTED POSITION MEASUREMENTS

CROSS-REFERENCE TO RELATED APPLICATIONS

This application is a continuation of copending International Application No. PCT/EP2018/085013, filed Dec. 14, 2018, which is incorporated herein by reference in its entirety.

Embodiments of the present invention refer to a method for determining the position of a target device within a communication network. Further embodiments refer to a corresponding target device comprising a receiving unit and a radio frequency (RF) measurement unit, to a base station or a location server comprising a selector and a transmitter, and to a reference device with configurable properties. Further embodiments refer to a system comprising a base station or a location server, a target device, and a reference device for determining the position of a target device within a communication network.

BACKGROUND OF THE INVENTION

Narrowband Internet of Things (NB-IOT) devices are only supported with an observed time difference of arrival (OTDOA) positioning method which does not achieve good performance and sufficient accuracy, and it requires a time synchronization among the base stations.

Reference is made to the document Sven Fischer: "Introduction to OTDOA on LTE Networks", 7 Aug. 2014, pages 1-18, XP055533290, Retrieved from the Internet, URL: https://www.qualcomm.com/media/documents/files/intro-duction-to-otdoa-on-lte-networks-highlights.pdf [retrieved on 2018 Dec. 12]. The document discloses an observed time difference of arrival (OTDOA) positioning, wherein a user equipment (UE) conducts reference signal time difference (RSTD) measurements between two cells—the reference cell and a measured neighbouring cell. The document further discloses the usage of positioning reference signals (PRS) to allow the UE to perform proper timing (ranging) measurements of signals from multiple cells to improve OTDOA positioning performance. The document also introduces 'PRS muting', that is, eNodeBs can be configured for time based blanking. When strong PRS signal is muted, the weak PRS signals from neighbour cells are more easily detected by the user equipment.

Reference is made to the document QUALCOMM INCORPORATED: "Combined Downlink and Uplink NR Positioning Procedures", 3GPP DRAFT; R2-1817899_(PO-SITIONING PROCEDURES); 3RD GENERATION PART-NERSHIP PROJECT (GPP), MOBILE COMPETENCE CENTRE, 650, ROUTE DES LUCIOLES; F-06921 SOPHIA-ANTIPOLIS CEDEX; FRANCE; RAN WG2; Spokane, USA; 20181112-20181116 12 Nov. 2018. The document discloses a round trip-time (RTT) positioning, wherein the position of a device can then be determined based on distance (RTT) measurements to multiple base stations.

Power consumption is an issue for low power wide area network (LPWAN) devices, like NB-IOT devices, thus, the update rate of the IOT devices is very low. Fingerprinting, continuous power detection of other nodes during reception or transmissions at higher rates are power-consuming options. Moreover, LPWAN devices, like NB-IOT, cannot directly communicate with each other.

SUMMARY

According to an embodiment, a method for determining the position of a target device within a communication network may have the steps of: receiving information about a transmitting time and frequency allocation of a reference device, formed by an internet of things, IOT, device, within the communication network at the target device from a base station or a location server; expecting a signal transmitted by the reference device and performing a radio frequency, RF, measurement by the use of the information, so as to obtain a measurement value dependent on a distance between the target device and the reference device, wherein the target device performs the RF measurement on the expected transmitted signal; wherein the base station or the location server triggers the reference device to transmit the signal; and wherein the method includes calculating the position of the target device based on the results of the RF measurements.

Another embodiment may have a reference device formed by an IOT device, in a radio resource control connection mode and/or configured to be triggered on request by a base station or by a location server with a wake-up signal or through an extended discontinuous reception mechanism for transmission operations, in order to provide an opportunity to repeat a signal and/or enhance the ability of a target device to receive the signal from the reference device, wherein the transmitted signal is configured to be triggered by the base station or by the location server or is configured to be a timely scheduled transmission of the reference device.

According to another embodiment, a system may have a base station or a location server and one or more reference devices formed by an IOT device, in a radio resource control connection mode and/or configured to be triggered on request by a base station or by a location server with a wake-up signal or through an extended discontinuous reception mechanism for transmission operations, in order to provide an opportunity to repeat a signal and/or enhance the ability of a target device to receive the signal from the reference device, wherein the transmitted signal is configured to be triggered by the base station or by the location server or is configured to be a timely scheduled transmission of the reference device, wherein the system is configured to perform a method determining the position of a target device within a communication network, the method having the steps of: receiving information about a transmitting time and frequency allocation of a reference device, formed by an internet of things, IOT, device, within the communication network at the target device from a base station or a location server; expecting a signal transmitted by the reference device and performing a radio frequency, RF, measurement by the use of the information, so as to obtain a measurement value dependent on a distance between the target device and the reference device, wherein the target device performs the RF measurement on the expected transmitted signal; wherein the base station or the location server triggers the reference device to transmit the signal; and wherein the method includes calculating the position of the target device based on the results of the RF measurements.

Another embodiment may have a non-transitory digital storage medium having a computer program stored thereon to perform the inventive method for determining the position of a target device within a communication network, when said computer program is run by a computer.

An embodiment of the present invention provides a method for determining the position of a target device within a communication network. The method comprises the following steps:

The target device receives information about a reference device within the communication network from a base station or from a location server.

The target device performs a RF measurement by the use of the information where the measurement value depends on a distance between the target device and the reference device.

A multitude of IOT devices is spread over the coverage area of the communication network. The low cost of the IOT devices makes the deployment of IOT devices and/or beacons, for supporting or for providing positioning applications, a very attractive solution. Stationary IOT devices or moving IOT devices with positioning sensors can be used as reference devices for enhancing the capability to determine the position of a mobile target device within the communication network. A mobile target device, which can detect some characteristics of transmissions of neighboring reference devices, is informed by the base station or by the location server, where the signals are expected to be in time and in frequency. The target device does not explicitly need to know which devices are transmitting. The measurement unit of the target device performs power detection based on the information received from the base station or from the location server. These can range from low complexity detection of simple parameters, like RF power, to full reception and/or decoding. By this process, additional measurement values dependent on the distance between the target device and the reference devices become available.

Using the already available reference devices improves the accuracy of positioning the target device without major expenses.

According to further embodiments, the method further comprises a step wherein a single base station or multiple base stations or the location server performs a coarse estimation of the position of the target device.

According to embodiments, the target device, the base station or the location server requests, as a first step, the position of the target device. The base station or the location server can determine the position of the target device coarsely. The coarse estimation is, for example, done based on rough timing measurements (timing advance), cell ID information and can be combined with a receive signal strength indication (RSSI) or, if supported, through an observed time difference of arrival (OTDOA) approach. The coarse position of the target device defines a pool of reference devices whose transmitted signals can be detected by the target device. Moreover, further position calculations are based on the coarse position of the target device.

The method further comprises a step, in which the base station or the location server chooses a reference device from the pool of devices within a detectable range from the target device. The choice of which reference devices to use for assistance can be based on the transmission time, as low power IOT devices do not transmit very often, and/or based on the position of the reference devices and/or the type of the application of the target device to be located (for example, bikes need faster measurements than key tracking). Choosing a reference device which is closer to the estimated position of the target device is reducing the measurement uncertainty of the position of the target device. Choosing a reference device which transmits within a short time and/or more frequently allows that the RF measurements can be started sooner.

The method further comprises that the base station or the location server requests information about the capabilities and/or the configurations of the target device from the target device. In response to this request, the target device provides the information about its capabilities and configurations for the base station and/or for the location server. Similarly, the base station or the location server requests information about the capabilities and/or the configurations of the reference device from the reference device. In response to this request, the reference device provides the information about its capabilities and configurations for the base station or for the location server.

NB-IOT devices, like the target device and/or the reference device, can only communicate with the communication network mainly through the serving base station (eNB). That means that within this communication, reference signals are exchanged in uplink, i.e. device transmits to eNB, and in downlink, i.e. eNB transmits to device, such as sounding reference signal (SRS), synchronization signals or other dedicated signaling.

As target device and the reference cannot communicate directly with each other the base station and/or the location server takes the role of collecting information from and/or configuring the target device and/or the reference device, allowing an indirect communication between the target device and the reference devices.

According to further embodiments, the method comprises a step where the base station or the location server triggers the chosen reference device to transmit a signal and/or the base station or the location server is informed on a scheduled transmission by the reference device or by the location server or by the base station. After a coarse estimation, the base station and/or a location server makes a set of hypotheses allowing the target device to possibly narrow down the uncertainty region. For that, the base station or the location server either triggers the reference device or has the knowledge of the transmitting time and frequency allocation of the reference device. The base station or the location server sends information to the target device about the transmitting time and frequency allocation of the reference device and/or when the reference device was triggered by the base station or the location server. This information allows the target device to measure the power at determined time intervals and/or when the reference device is triggered by the base station or the location server. The result of the measurement can be used to enhance the accuracy and/or reduce the uncertainty achieved in the coarse positioning estimation.

According to further embodiments, the method comprises that the base station or the location server sends information to the target device about the scheduled transmission and/or a frequency of the chosen reference device. The positioning target device is informed by the base station or location server of the communication network about where the signals are expected to be in time and in frequency. The target device does not even explicitly need to know which devices, with which device IDs, are transmitting.

For example, a target device A is informed that three signals, corresponding to three reference devices, are transmitted at time t1, t2 and t3 with the transmission frequencies of the reference devices respectively.

In an exemplary scenario, the base station or the location server informs the target device for example over an LTE positioning protocol (LPP) about the time, for example in subframes or in other time units, of the first scheduled or expected reference device transmission. Furthermore, the base station or the location server can be configured to inform the target device about the timing information of the reference device in the communication network relative to other reference devices. By providing information about the periodicity of the reference signal and/or time information relative to other reference signals can further reduce the complexity of finding the reference signals.

Further, the method comprises that the base station or the location server indicates a search window to find a transmitted signal of the reference device in order to perform the RF measurement. By providing information about the timing of the search window, the base station or the location server assists the target device to efficiently find the transmitted signals. Otherwise, the target device will have to search for the signal over time which adds undesired complexity for low power devices.

According to embodiments, the method further comprises that the target device performs RF measurements on transmitted signals of the reference devices when the reference device is triggered and/or based on the information, about the transmitting time and frequency of the reference device, received from the base station or the location server. A measurement unit of the positioning target device performs power detection and obtains information about the received signals strength indication (RSSI) and/or about the signal noise ratio (SNR). In some cases, for example when the reference signal is known, the channel response can be determined as well. In other words, the target device treats the reference devices as a source, thus an application of a sidelink protocol is not needed.

According to further embodiments, the method comprises that the base station or the location server requests measurement results of the RF measurement from the target device. In response to the request, the target device is providing measurement results and/or a time stamp of the RF measurement for the base station or for the location server. Another option is that the target device reports measurement results and/or a time stamp of the RF measurement to the base station or to the location server automatically, without a request from the base station of from the location server.

Reporting the results of the RF measurements allows more power efficient target devices because the more power consuming calculations could be performed by the base station and/or the location server.

The method further comprises a step, where the position of the target device is calculated based on the results of the RF measurements. Based on this calculation and based on the former coarse position estimation, a higher level of position accuracy could be reached and respectively the uncertainty region of the position of the target device could be narrowed down.

According to further embodiments, the method comprises that the base station or the location server allocates and/or deallocates one or more reference devices in time.

The base station or the location server can further allocate nearby reference devices. Repeating the measurements by using more reference devices can increase the accuracy of the position of the target devices and/or detect the movement of the target device. The movement of the target device can, for example, be detected by a difference between the measurement results of the RF measurements (e.g. RSSI) taken from the same reference device at different times.

An embodiment provides a system, comprising a base station or a location server, a target device and one or more reference devices for performing the method described above. Elements of the system will be explained below.

According to an embodiment, a base station or a location server comprises a selector for selecting one or more reference devices based on the transmission time and/or on the position of the reference devices and/or on the type of application of the target device. The base station or the location server further comprises a transmitter configured to transmit information about the reference device to a target device.

Using the information, the target device can perform an RF measurement in order to obtain a measurement value dependent on a distance between the target device and the selected reference device. The base station or the location server is configured to, for example, inform the target device about where the signals are expected to be in time and frequency.

According to an embodiment, a base station or a location server is configured to perform a coarse estimation of the position of the target device. The serving base station can, however, not determine the position accurately enough. The coarse estimation is done, for example, based on rough timing measurements (like timing advance), on cell ID information and can be combined with the RSSI measurements or if supported through the OTDOA approach. The coarse position estimation could be used as a base for more accurate position calculations and for determining a pool of reference devices within a detectable range from the target device.

According to embodiments, the selector of the base station or of the location server is configured to choose the reference device from a pool of devices within a detectable range from the target device. Choosing the right reference devices is needed for a more accurate calculation of the position of the target device. A detectable reference device, i.e. the transmitted signal of the reference device is detectable at the target device, is a minimum requirement for an RF measurement. Choosing a closer reference device also means RF measurements are more accurate, which leads to a more accurate target device position calculation.

According to further embodiments, the base station or the location server is configured to trigger the chosen reference device to transmit a signal and/or to send information to the target device about the transmitting time and frequency of the chosen reference device. NB-IOT devices can only communicate with each other in the communication network mainly through the base station. Providing information about the time and frequency allocation of the signal transmission to the target device removes the undesired complexity of searching the transmitted signal of the reference device. The transmitted reference signal could be triggered by the base station or the location server or it could be a timely scheduled transmission of the reference device.

According to a further embodiment, a base station or a location server is configured to calculate the position of the target device. The calculation is based on the coarse positioning estimation which is enhanced by the results of the RF measurements of the target device. After the calculation the position of the target device has a better accuracy and/or a smaller measurement uncertainty.

The next element of the above-described system is the target device which comprises a receiving unit for receiving information from the base station or from the location server about the chosen reference device within the communication network. The target device further comprises an RF measurement unit for performing RF measurements by the use of the information, in order to obtain a measurement value dependent on a distance between the target device and the reference device. The target device is informed by the base station or the location server of the communication network about where the signals are expected to be in time and in frequency. The target device treats the reference device as a source. With the use of the information about time and frequency, the target device is expecting the signal transmitted by the reference device without applying a sidelink protocol. The measurement unit of the target device performs, for example, a power detection and obtains, for example, RSSI and/or signal noise ratio values. As these values are dependent on the distance between the target device and the reference device, they are used in the position calculation of the target device in order to improve the capability and the accuracy to determine the position of the target device within the communication network.

In an embodiment, the RF measurement unit is integrated into the receiving unit or implemented as a separate RF detector.

In case the RF measurement unit is integrated into the receiving unit of the IOT device, two operation modes are common: Time division duplex (TDD) and frequency division duplex (FDD).

In case of TDD in NB-IOT standard, the receiving and transmitting frequency are the same hence the NB-IOT is in principle capable of performing all the measurements mentioned above on the signals transmitted by the reference devices, such as the synchronization reference signals.

In case of FDD operation mode, the same principle can be applied, but only if the target device is able to receive the carrier frequencies used by the reference device for uplink transmission.

Low power RF detectors are used in case the target device does not have a receiving unit or the FDD operation mode does not support such measurements. Low power RF detectors are allowing NB-IOT devices without RF measurement capabilities to perform RF measurements.

In an embodiment, a target device is configured to use a search window to find a transmitted signal of the reference device. The base station or the location server assist the target device to efficiently find a transmitted signal by providing timing information of the search window. The search window can, for example, be applied for a reference signal time difference (RSTD) measurement according to the technical specification (TS) 36.355 for OTDOA positioning.

In case of the reference devices transmitting a periodic or preconfigured pattern of signals, the target device can use the period information, such as frame ID and the pattern to track the next bursts of reference signals. With the use of the period information and after successful detection, tracking a reference device becomes a simpler task, thus the target device can choose a shorter window when predicting the next signal.

According to embodiments, the search window value and an uncertainty of window size of the search window is determined by the base station or the location server based on for example, the timing advance information, the maximum frequency offset between the target device and the current reference device, the maximum timing misalignment between the target device, the reference device and the base station or the location server and the transmission time between the transmission from the reference device and the reception at the target device. These information, or a part of it, are provided to the target device by the base station or the location server. Without these information, the target device has to search for the signal emitted by the reference device over time which adds undesired complexity for low power devices. The main limitation of the search window could be that the time is related to the signal from a reference cell, for example in system frame number (SFN) unit, under the assumption that all base stations or location servers are synchronized.

In an embodiment, the target device comprises a second sensor, like a speed, direction, etc. sensor, wherein the target device is configured to transmit the sensor information of the second sensor to the base station or to the location server. The base station or the location server in a communication network can optionally use a state of the art and/or other sensor information, like temperature, humidity (indication for indoor or outdoor), movement sensors that can provide further information for the base station or the location server, which can be used in the position calculation of the target device.

According to embodiments, a third component of this system described above is a reference device. The properties, like period, power, etc. of the reference device are configurable by the base station or by the location server.

The reference device gets the information for transmission which configures, for example, the sequence, set ID, period and power, or updates the needed parameters in case already configured. The base station or the location server controls the power, i.e. the knowledge of transmission power is given in communication system by reporting the reference power to the base station or the location server. It can be set, in case of the power needs to be increased or attenuated, based on the report of the target devices.

According to a further embodiment, the reference device is configured to periodically transmit information to the base station or to the location server and/or to be triggered by the base station or by the location server. The reference device can either be in radio resource control (RRC) connection mode and/or the reference device can be triggered on request by the base station or by the location server, for example with a wake-up signal or through the extended discontinuous reception (eDRX) mechanism, for transmission operations. Being able to be triggered by the base station or the location server provides an opportunity to repeat the reference signal and/or enhances the ability of the target device to receive reference signals from a reference device.

According to further embodiments, a reference device comprises a sensor for determining the position of the reference device or having a fixed position. Stationary IOT devices with a known position or IOT devices with positioning sensors are used to enhance the accuracy of the position calculation of the target device. Their known position is used as a reference position from which the target device is configured to measure and/or calculate its own distance or a value dependent on this distance.

According to further embodiments, a reference device comprises a second sensor, like speed, direction, etc. sensor, wherein the reference device is configured to send sensor information of the second sensor to the base station or to the location server. The base station or the location server can optionally use state of the art and/or other sensor information, like temperature, humidity, position of the reference device, speed, direction, movement sensors in their calculations that can provide further information.

BRIEF DESCRIPTION OF THE DRAWINGS

Embodiments of the present invention will be detailed subsequently referring to the appended drawings, in which.

DETAILED DESCRIPTION OF THE INVENTION

Below, embodiments of the present invention will subsequently be discussed referring to the enclosed figures. Here, identical reference numbers are provided to elements having identical or similar functions, so that the description is mutually applicable and interchangeable.

Figure 1A:
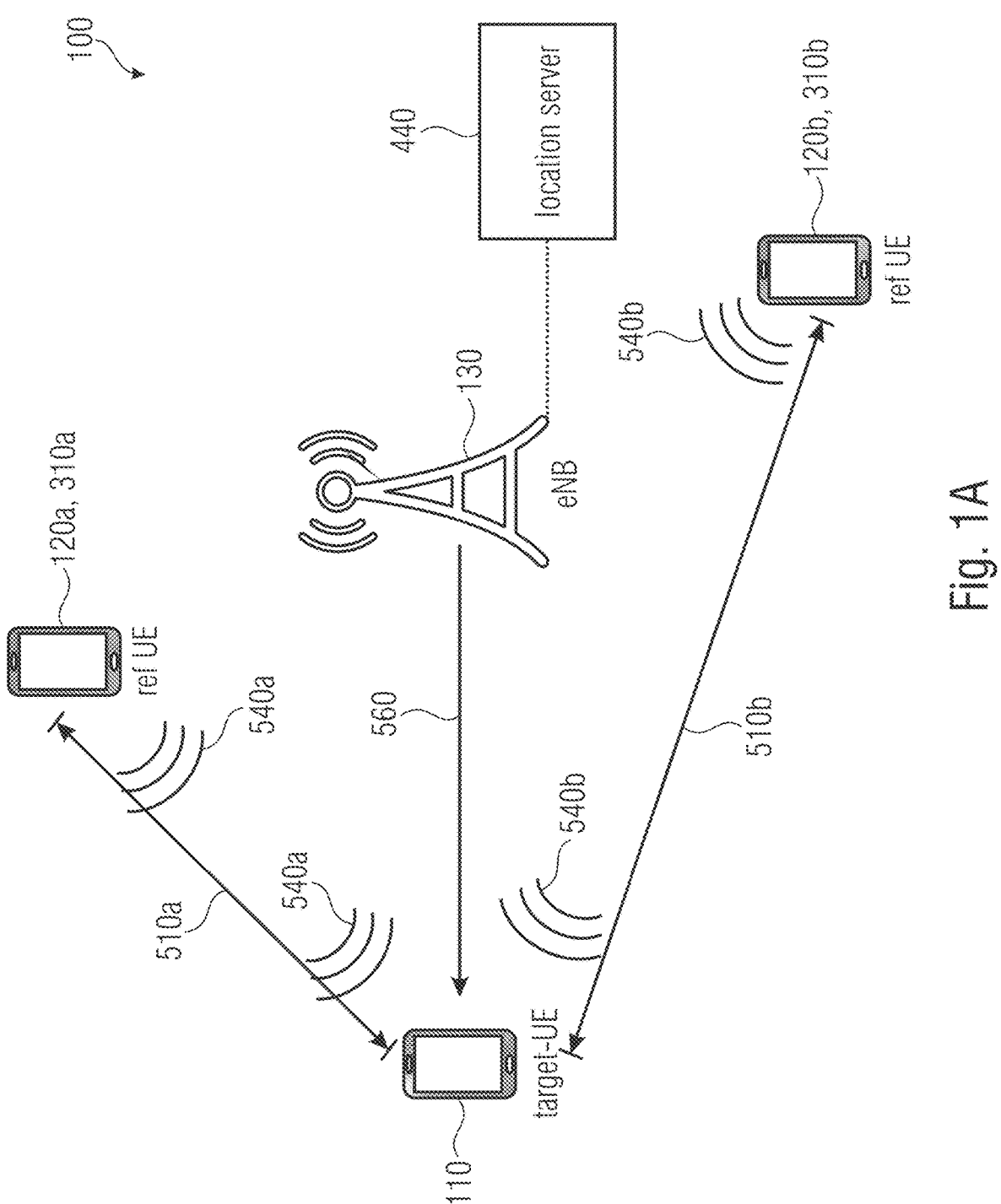
FIG. 1A shows a schematic representation of the method of receiving information from the base station or from the location server and performing RF measurements on the reference signals of the reference device according to a basic embodiment.

FIG. 1A shows a communication network 100, or in other words, a system 100, comprising a target device 110, two reference devices 120a and 120b (or 310a and 310b), a base station 130 and a location server 440. The base station 130 is connected to the location server 440 and wirelessly connected to the target device 110 and the reference devices 120a and 120b.

The target device 110 is a mobile device with an unknown position. The target device 110 is capable of receiving information 560 from the base station 130 or from the location server 440, and performing an RF measurement on the reference signals 540a and 540b.

The reference IOT devices 120a and 120b may have different applications, for example parking metering, smart lighting, smart metering, monitoring in industrial or agricultural applications. These devices are, due to their use case, stationary or their location is known because the device is equipped with an extra positioning sensor, like a Global Navigation Satellite System (GNSS). The reference devices 120a and 120b are capable of sending a reference signal 540a and 540b.

There is a distance 510a between the target device 110 and the reference device 120a. Similarly a distance 510b is between the target device 110 and the reference device 120b. The base station 130 or the location server 440 sends information 560 to the target device 110 about the transmit time and frequency of the reference device 120a or 120b within the communication network 100. The target device 100 receives the information 560 from the base station 130 or from the location server 440. By using the obtained information 560 the target device is waiting or searching for the reference signal 540a or 540b sent by the reference device 120a or 120b in order to perform RF measurements on the reference signal 540a or 540b. The RF measurement obtains a measurement value dependent on the distance 510a or 510b between the target device and reference device 120a or 120b, which sent the reference signal 540a or 540b measured by the target device 110. The obtained measurement value can be used in the position calculation of the target device 110, thus improving the accuracy and/or reducing the uncertainty.

Figure 1B:
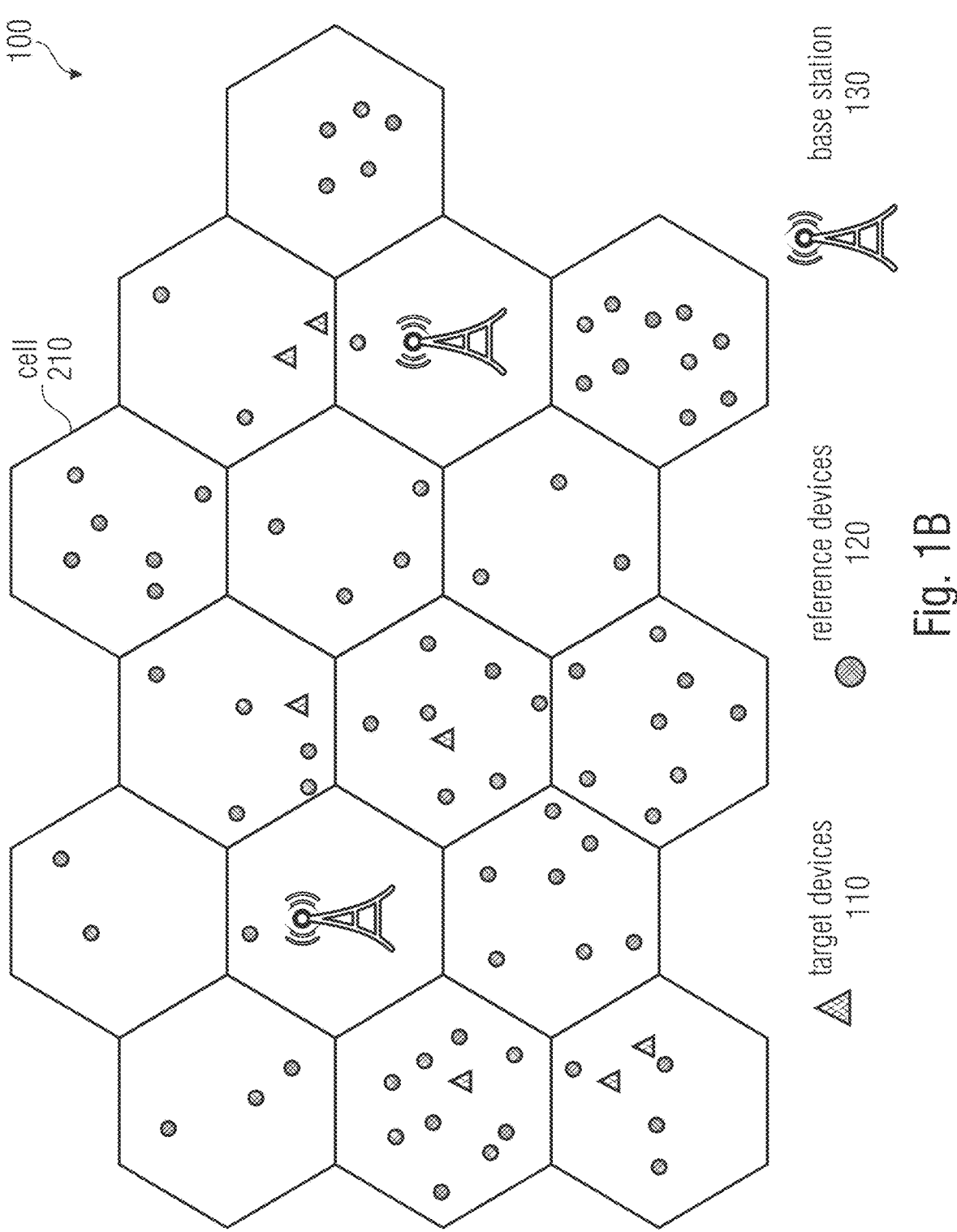
FIG. 1B shows a schematic representation of a communication system comprising base stations, target devices and reference devices according to a further embodiment.

FIG. 1B shows a communication network 100, or in other words, a system 100, comprising target devices 110, reference devices 120 and base stations 130 within the cells 210 of the network 100. The target devices 110 and the reference devices 120 are wirelessly connected or can wirelessly communicate with the base stations 130, but they cannot communicate with each other. Reference devices 120 may have a well-known position, either because of their stationary operation or because of their integrated positioning sensor. Target devices 100 are, for example, moving mobile devices with unknown position. The present invention improves the position calculation of the target device 110. It is based on the idea that a multitude of reference devices 120 with known position are deployed all over the communication network 100 and can be used for enhancing the capability to determine the position of the target devices 110 within the communication network 100. By performing RF measurements on the reference signals transmitted by the reference devices 120, the target device can obtain a measurement value dependent on the distance between the target device and the reference device 120 which transmitted the measured reference signal.

Figure 2:
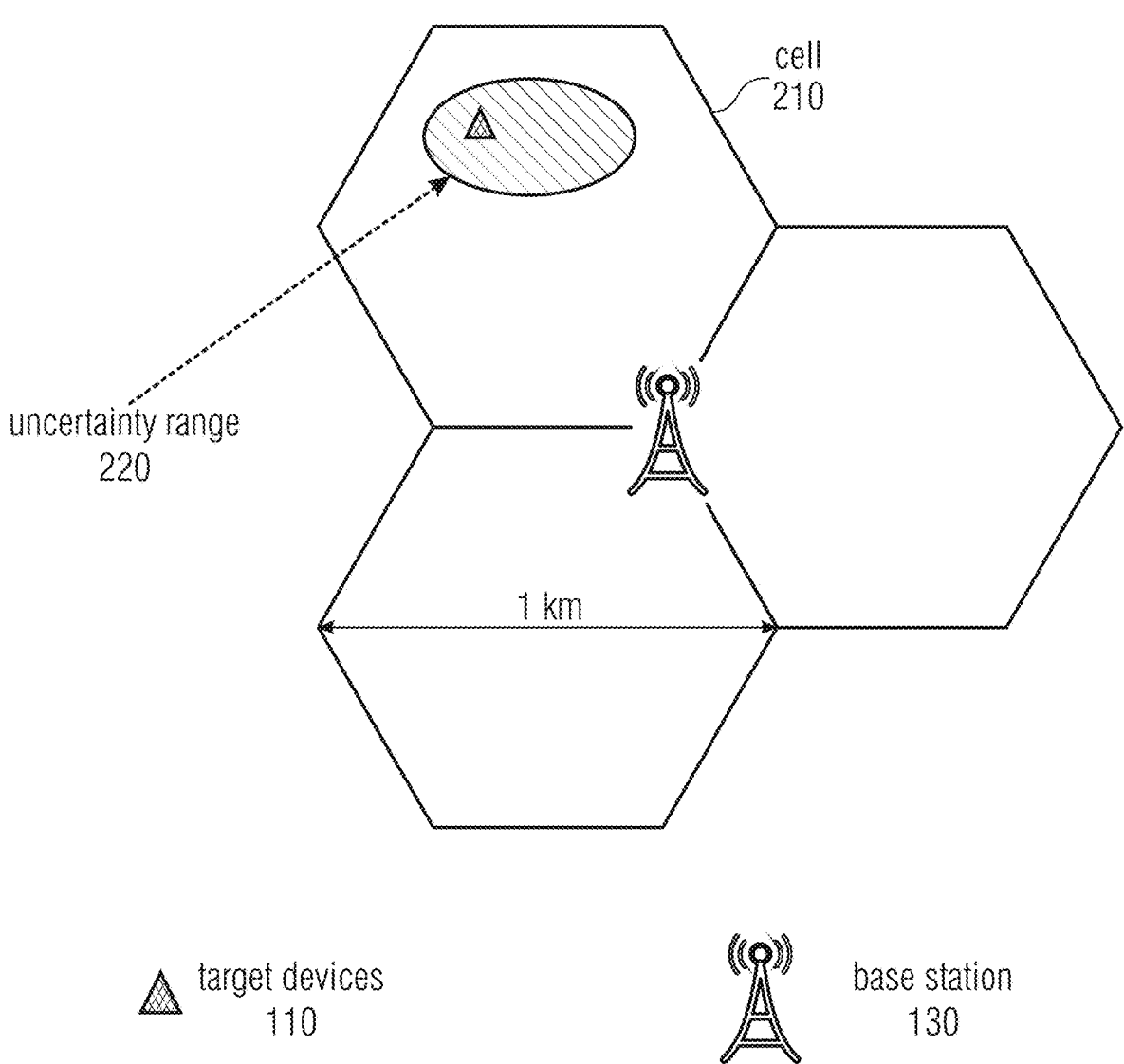
FIG. 2 shows a schematic representation of a coarse position estimation with a large uncertainty region.

The first step of determining the position of a target device 110 is a course estimation of the position of the target device 110. FIG. 2. shows a part of the communication network, comprising a base station 130 and a target device 110 within one of cells 210. FIG. 2 does not show any reference devices 120. The position of the target device 110 is not accurate, it has a large uncertainty 220.

The base station 130 can determine the position of the target device 110, however, with a large uncertainty 220. The rough estimation can be done based on, for example, a rough timing measurement, like timing advance, with the use of the ID of the cell 210, RSSI measurements or if supported through the OTDOA approach.

Figure 3:
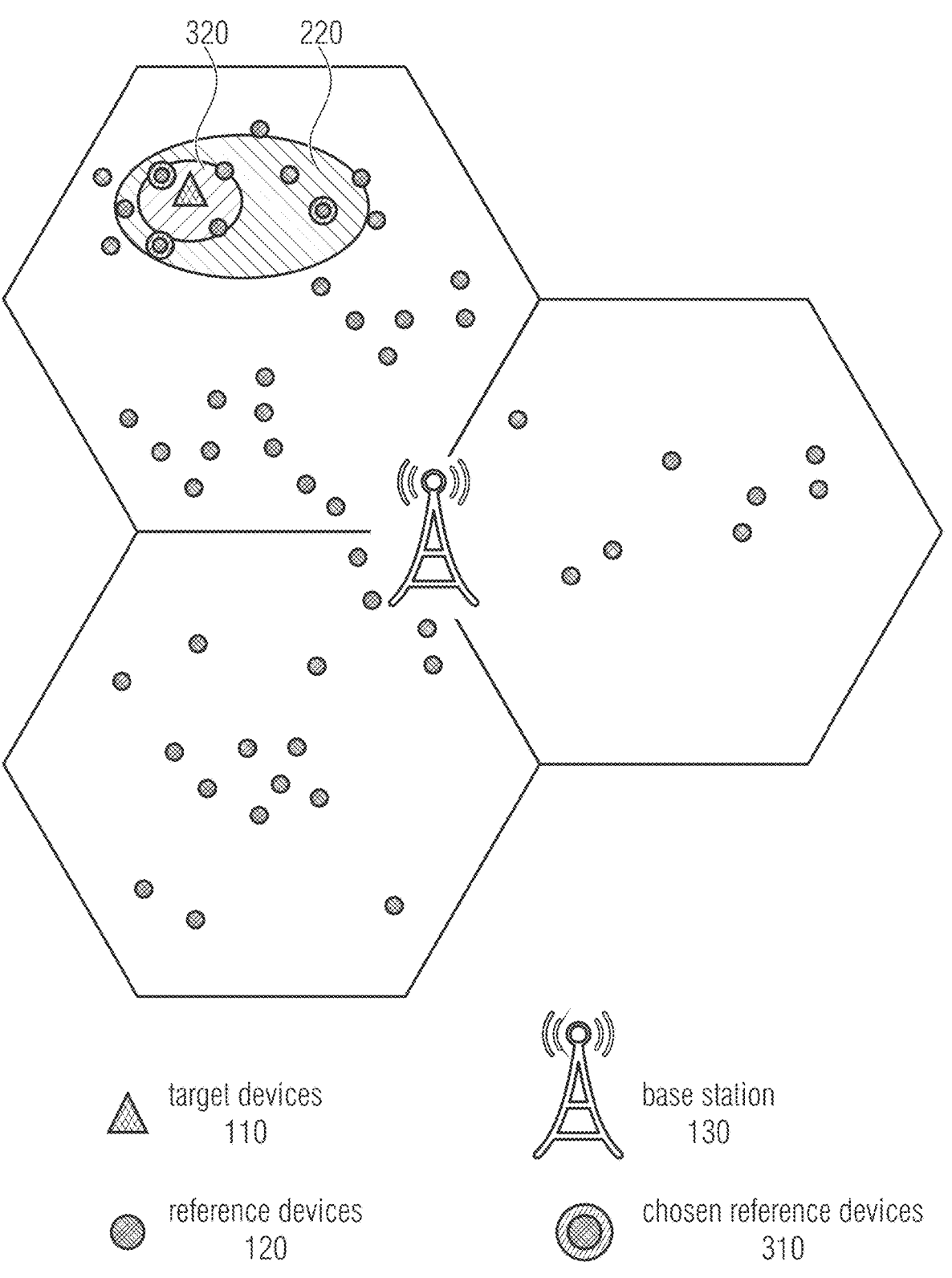
FIG. 3 shows a schematic representation of selecting one or more reference devices for involving them in the RF measurements in order to narrow down the uncertainty region of the target device according to a further embodiment.

FIG. 3 illustrates a part of the communication network 100. It comprises a base station 130, a target device 110, a multitude of reference devices 120 and three chosen reference devices 310 within the cells 220. FIG. 3 further illustrates the coarse uncertainty range 220 and the more accurate uncertainty range 320 of the position of the target device 110 before and after using the measurement values in the position calculation.

The rough position of the target device 110 with a great uncertainty 220 is used to choose one or more reference devices 120. The chosen reference devices 310 are selected from a pool of reference devices 120 based, for example on the transmission time and/or on the position of the reference devices 120 and/or the type of the application of the target device 110. RF measurements are performed by the target device 110 on the reference signals transmitted by the reference devices 120 resulting a measurement value dependent on the distance between the chosen reference device 310 and the target device 110. Including these values into the position calculation of the target device 110 results in a more accurate target device position and/or reducing the rough uncertainty range 220 to a more accurate uncertainty range 320.

Figure 4:
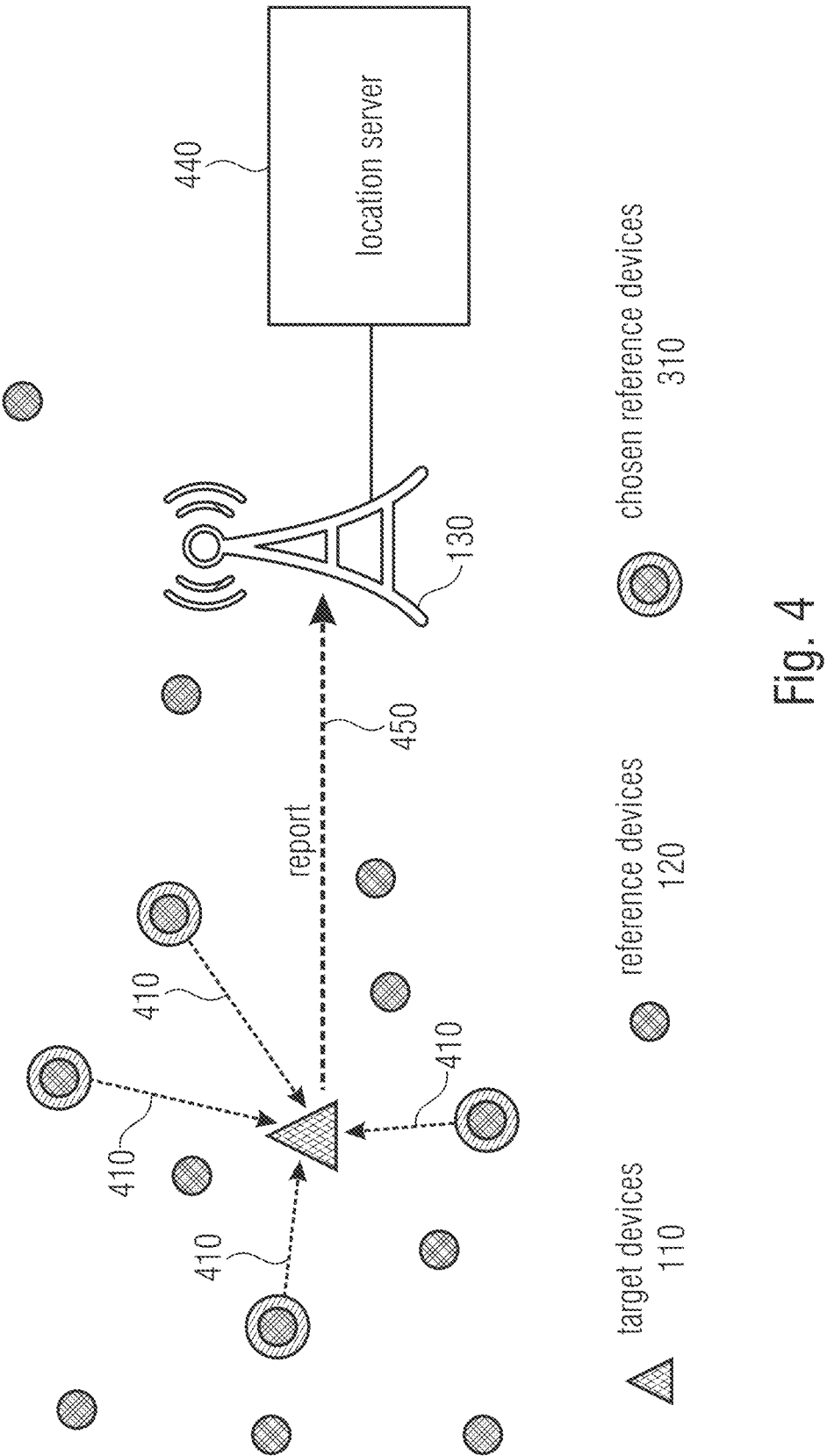
FIG. 4 shows a schematic representation of the concept of measuring one or more reference signals of the reference devices, and reporting the results to the base station and/or to the location server according to a further embodiment.

The RF measurement is further explained in FIG. 4. FIG. 4 illustrates a part of a communication system comprising a base station 130 connected to a location server 440, a target device 110, a multitude of reference devices and four chosen reference devices 310. FIG. 4. Further shows reference signals 410, transmitted by chosen reference devices 310 and measured by the target device 110, and a report 450 on the measurement values transmitted by the target device 110 and received by the base station 130.

After selecting some chosen reference devices 310 from a pool of reference devices 120 as illustrated in FIG. 3, the target device 110 performs RF measurements on the reference signals 410 transmitted by the chosen reference devices 310. The result of the RF measurements are transmitted as a report 450 to the base station 130 or to the location server 440 which is connected to the base station.

Figure 5:
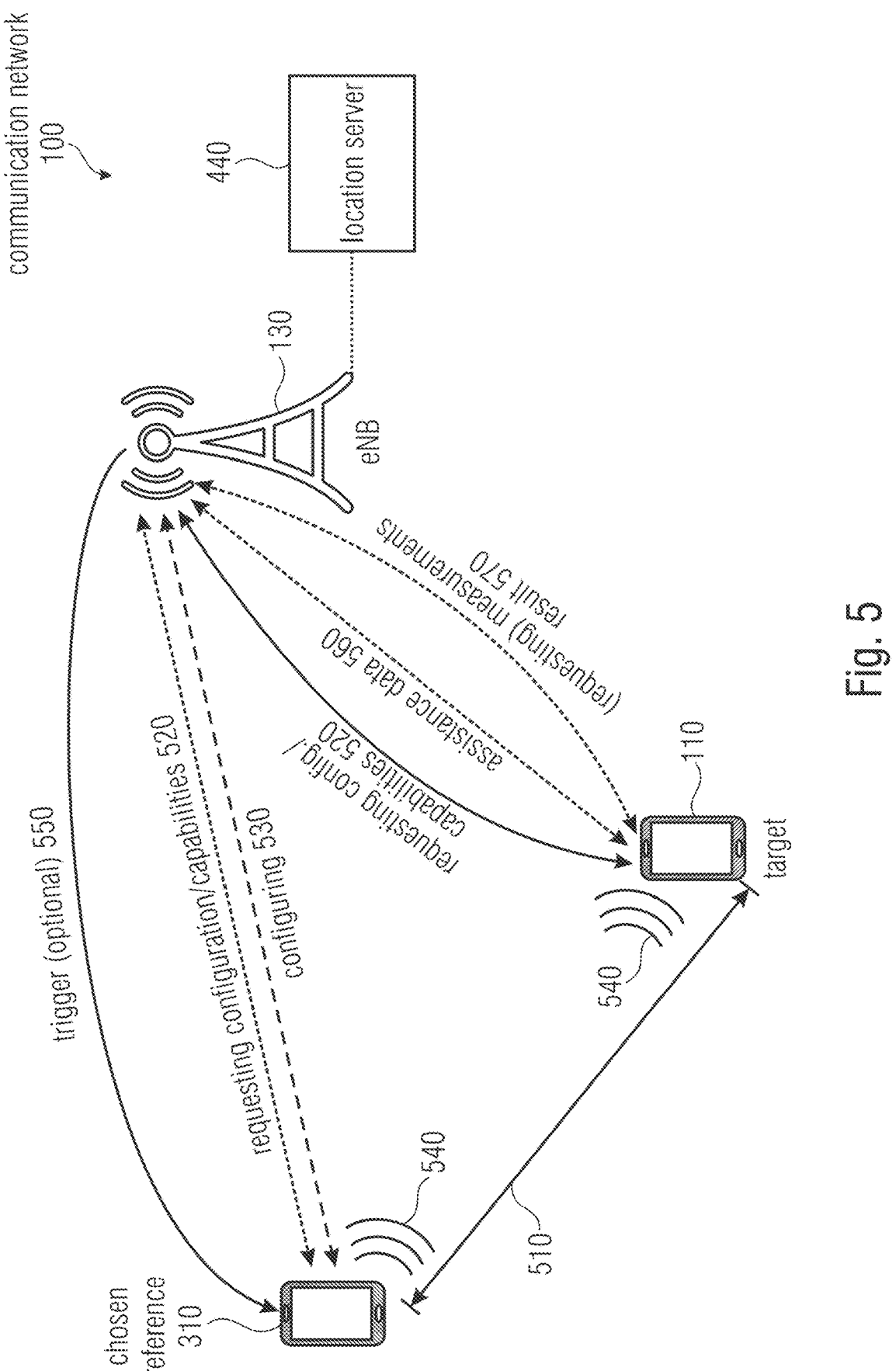
FIG. 5 shows a schematic representation of the process of configuring and measuring the reference signal of the reference device and sending the results to the base station or to the location server according to a detailed embodiment.

FIG. 5 illustrates a part of a communication network, comprising a base station 130 connected to a location server 440 and wirelessly connected to a chosen reference device 310 and a target device 110. The target devices is capable to communicated with the base station 130 and/or with the location server 440 and capable of performing RF measurements on the reference signal 540 transmitted by the chosen reference device 310 within a distance 510. The chosen reference device 310 is capable of communicating with the base station 130 and/or with the location server 440 and is configurable by the base station 130 and/or the location server 440. Optionally the reference signal can be triggered by the base station 130 and/or by the location server 440.

FIG. 5 shows an overview for the steps of a procedure gathering measurement values dependent on the distance 510 between the chosen reference device 310 and the target device 110. In a communication network 100, the chosen reference device 310 and the target device 110 can only communicate with each other mainly through the base station 130. As the first step, the base station 130 is requesting 520 from the chosen reference device 310 and from the target device 110 information about the configuration and/or capabilities of the device itself. In response to the request 520, the chosen reference device 310 and the target device 110 provides the information about their capabilities and/or configurations for the base station 130 or to location server 440 connected to the base station 130. As the next step, the base station 130 configures 530 the chosen reference device 310. The reference device 310 gets the information for the transmission of the transmission signal 540 which configures the sequence, set ID, a period and power or updates the needed parameters in case already configured. The base station 130 or the location server 440 connected to the base station 130 controls the power of the signal 540 transmitted by the chosen reference device 310. After the configuration 530 of the signal 540, the base station 130 or the location server 440 can optionally trigger 550 the chosen reference device 310 and sends assistance data 560 to the target device 110 about where the signal 540 of the chosen reference device 310 is expected to be in time and in frequency. The target device 110 will apply a search window 930 in order to find the signal 540. As a next step, the target device 110 performs RF measurements on the signal 540 resulting a measurement value depending on the distance 510 between the chosen reference device 310 and the target device 110. As the last step, the base station 130 or the location server 440 connected to the base station 130 is optionally requesting the measurement results 570 from the target device 110 or the target device 110 is automatically sending the measurement results 570 to the base station 130 or to the location server 440 connected to the base station 130.

In other words, the configuration in FIG. 5 shows an overview for the proposed solution. The link between the base station 130 or the location server 440 connected to the base station 130 and the chosen reference device 310 is a new feature. Once the base station 130 or the location server 440 configured the chosen reference device 310, the reference device 310 is treated as a source from the perspective of the target device 110. That means that an application of a sidelink protocol is not needed.

Figure 6:
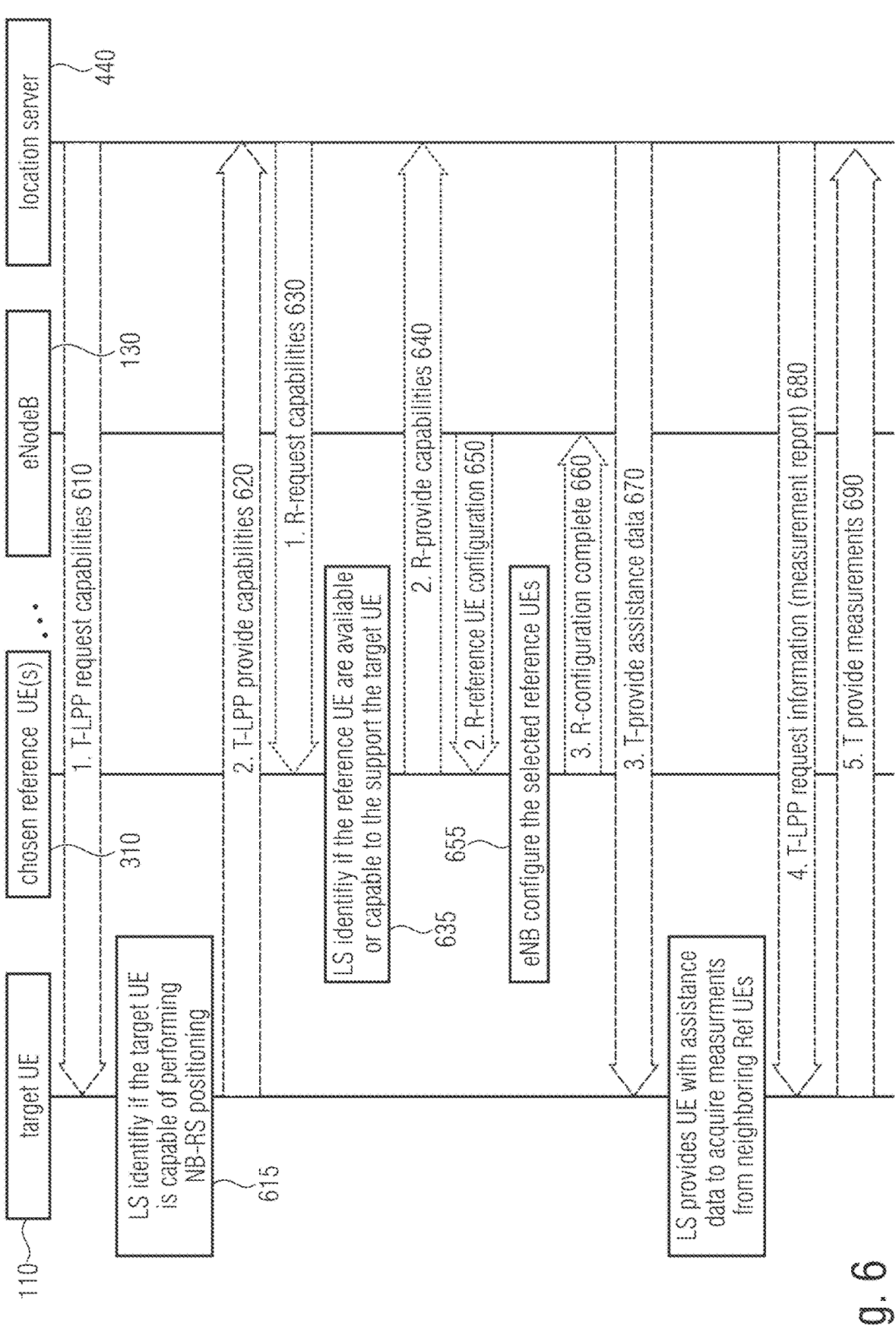
FIG. 6 shows a schematic representation of the communication and/or data exchange between the target device and the base station or the location server, the reference device and the base station or the location server.

FIG. 6 shows a signaling procedure comprising a target device 110, a reference device 120, a base station 130, a location server 440 and the signaling between them.

As a first step, the location server 440 is identifying whether the target device 110 is capable of performing RF measurements 615 and requests the capabilities 610 of the target device 110. In response the target device 110 provides its own capabilities 620 to the location server 440.

As a second step, the location server 440 is identifying 635 whether a reference device 120 is available and/or is capable of supporting the target device 110. The location server 440 requests the capabilities 630 of the reference device 120. In response the reference device 120 provides its own capabilities 640 to the location server 440.

As a next step, the base station 130 configures 655 the selected reference device 120. The base station 130 provides configuration data 650 to the selected reference device 120. After the configuration 655 the reference device 120 provides a configuration completed feedback 660 back to the base station 130.

As a next step, the location server 440 provides assistance data 670 to the target device 110 in order to acquire measurements from the neighboring reference devices 120.

As a next step, the location server 440 requests 680 a measurement report from the target device 110 and in response the target device provides 690 the measurement report to the location server 440.

In other words, FIG. 6 shows the main signaling procedure, the (due to the invention) extended LTE position protocol (LPP). The LPP procedures between the location server 440, for example, enhanced serving mobile location center (E-SMLC) or secure user plane location (SUPL) service location protocol (SLP) usually consists of: capability transfer, assistance data transfer, location information transfer. This represents the main signaling procedure in the current LTE positioning standard. Within this idea, the procedure is extended to cover the suggested received power algorithm. The signaling between reference device and the location server and/or the base station is a new feature, represented by red arrows, which can be applied either through the radio resource control (RRC) or from higher layer.

In other words, FIG. 6 shows an extended LTE positioning protocol where the green arrows represent the usual LTE positioning protocol and the red arrows represent the added steps.

Figure 7:
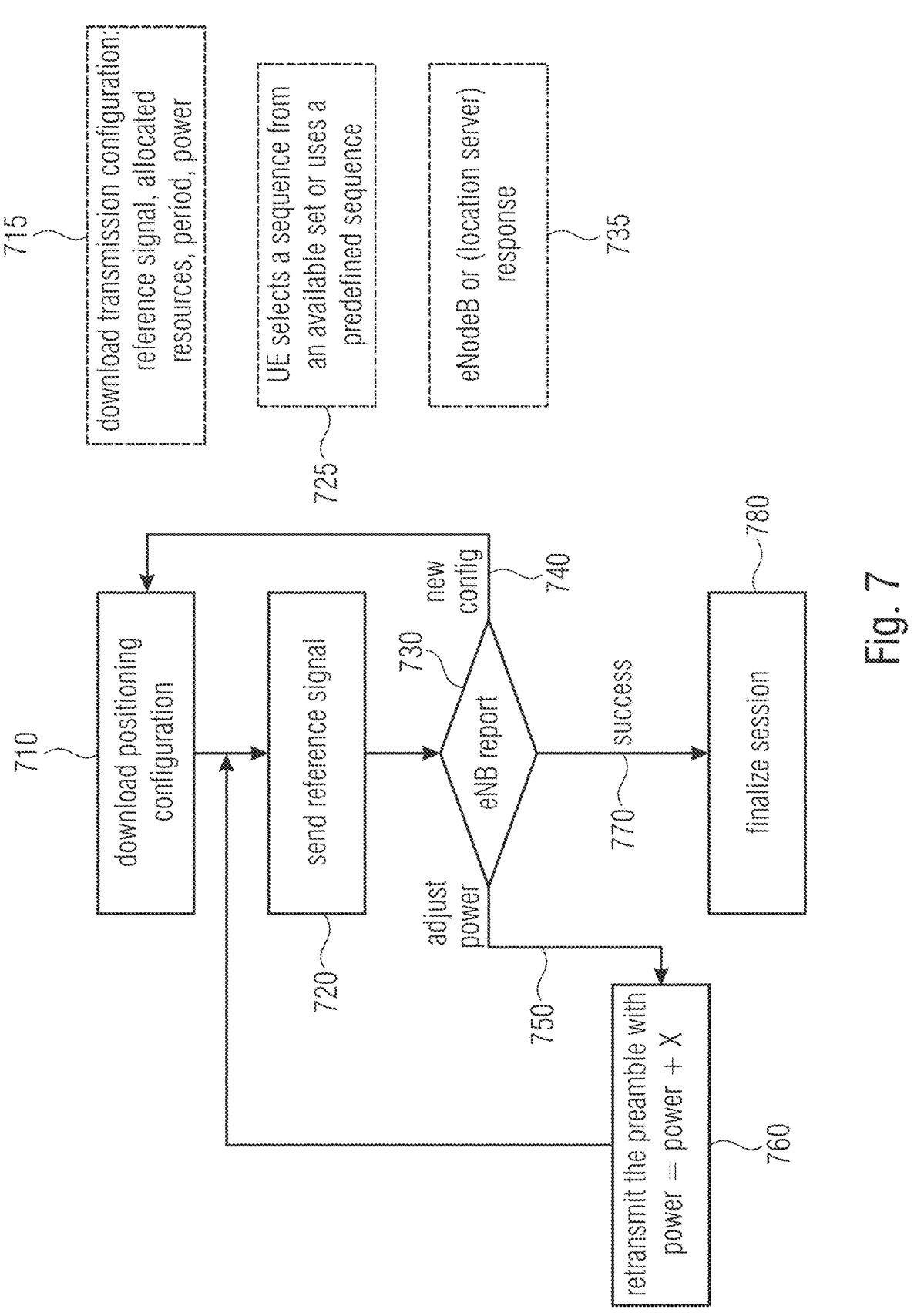
FIG. 7 shows a schematic flowchart of configuring the reference signal.

As mentioned above, the properties of the reference is configurable by the base station or the location server. An exemplary configuration is illustrated in FIG. 7. The reference device can either be in RRC connection mode or the reference device can be triggered on request, for example, with a wakeup signal or through the EDRX mechanism, for transmission operations.

The reference device gets the information for transmission, for example, which configures the sequence, set ID, period and power or updates the needed parameters in case already configured. The base station or the location server controls the power, that means the knowledge of transmission power is given in the system by reporting the power of the reference signal to the base station or the location server. It can be set in case of the signal power needs to be increased or attenuated based on the reports of the target device.

As a first step, the target device downloads 710 positioning configuration data 715. The configuration data 750 comprises a reference signal, allocated resources, period and power. As a next step, the reference device sends 720 a reference signal 725 to the base station 130 or to the location server 440. The reference signal 725 is a sequence from an available set or a predefined sequence. The base station 130 or the location server 440 reports 730 back to the chosen reference device 310. The response 735 of the base station 130 or the location server 440 can be a request for reconfiguration 740, a request for power adjustment 750 or a success feedback 770. In the case of the base station 130 or the location server 440 requests a new configuration 740, the chosen reference device 310 downloads 710 new position configuration data 715. After the reconfiguration, the chosen reference device 310 sends a second reference signal and waits for another report 730 from the base station 130 or from the location server 440.

If the response 735 of the base station or the location server is a request for readjusting power 750, the reference device modifies 760 the power of the transmitting signal. After the power adjustments, the reference device sends 720 a second reference signal and waits for the report 730 of the base station 130 or the location server 440. If the response 735 of the base station or the location server is a success feedback 770 then the chosen reference device 310 finalizes the session 780.

Figure 8:
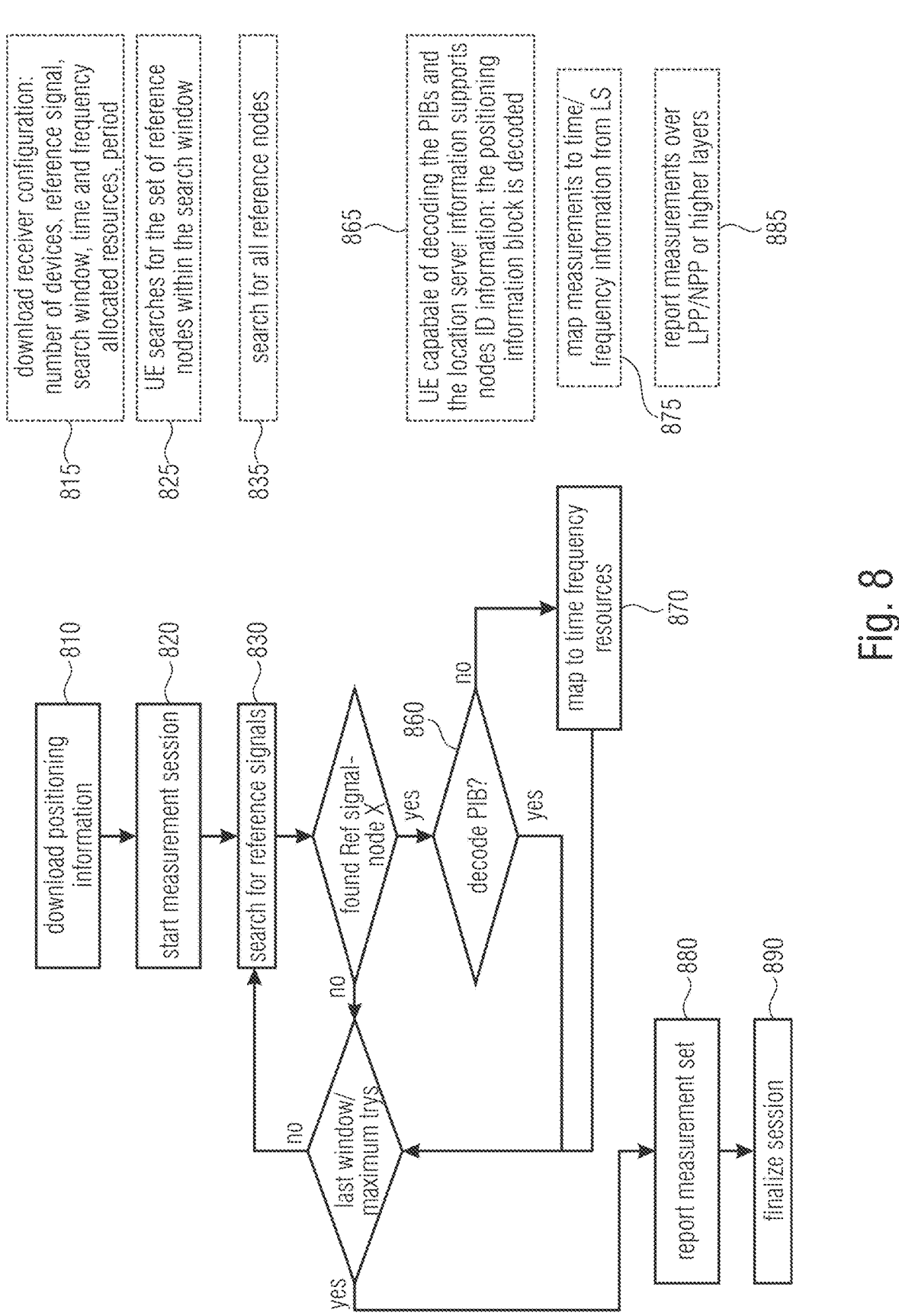
FIG. 8 shows a schematic flowchart of finding the reference signal, and reporting the results of the measurements to base station or to the location server.

The RF measurements of the target device is illustrated in FIG. 8. The reception at the target device is represented by the following steps:

The target device receives information from the base station or from the location server.

The target device sets the measurement, and if capable and available, the target device decodes the information from descend positioning information block (PIB) which contains, for example, the reference device ID defined or known at the base station or at the location server.

The target device reports the measurement results, such as RSSI, SNR, reference signal received power (RSRP), reference signal received quality (RSRQ), of each of the received signal time of the transmitted signal of the reference device. An antenna is used in the case of multiple antennas are supported by the target device.

In other words, the target device downloads 810 positioning information 815 from the base station 130 or from the location server 440. The positioning information 815, or receiver configuration 815, can comprise the number of devices, the reference signal, search window, time and frequency allocated resources. As the next step, the target devices starts the measurement session 820. The target devices searches for a set of reference devices within the search windows 825. The target device searches 830 for reference signals using a search window. The target device searches for all the reference devices 835. If the target device does not find any reference signals of the reference devices it searches further until the last window or the maximum number of tries are reached. If the target device finds a reference signal, it tries to decode the PIB 860. If the target device is capable of decoding the PIBs and the location server information supports the reference ID information, the positioning information block is decoded 865. If the target device cannot decode the PIB of the reference signal the signal will be mapped to time/frequency resources 870, that means mapping measurement value to time/frequency information from the base station or from the location server 875. As the last window or the maximum tries are reached, the target device reports 880 the measurement set, e.g., decoded PIB, mapped time frequency resources, to the base station or to the location server. The target device reports the measurement values over LPP protocol or over NPP protocol or using higher layers 885. After reporting the target device finalizes 890 the session.

In order to find reference signals of the reference devices, the target device using a search window. The usage of the search window is described in FIG. 9 and in FIG. 10.

Figure 9:
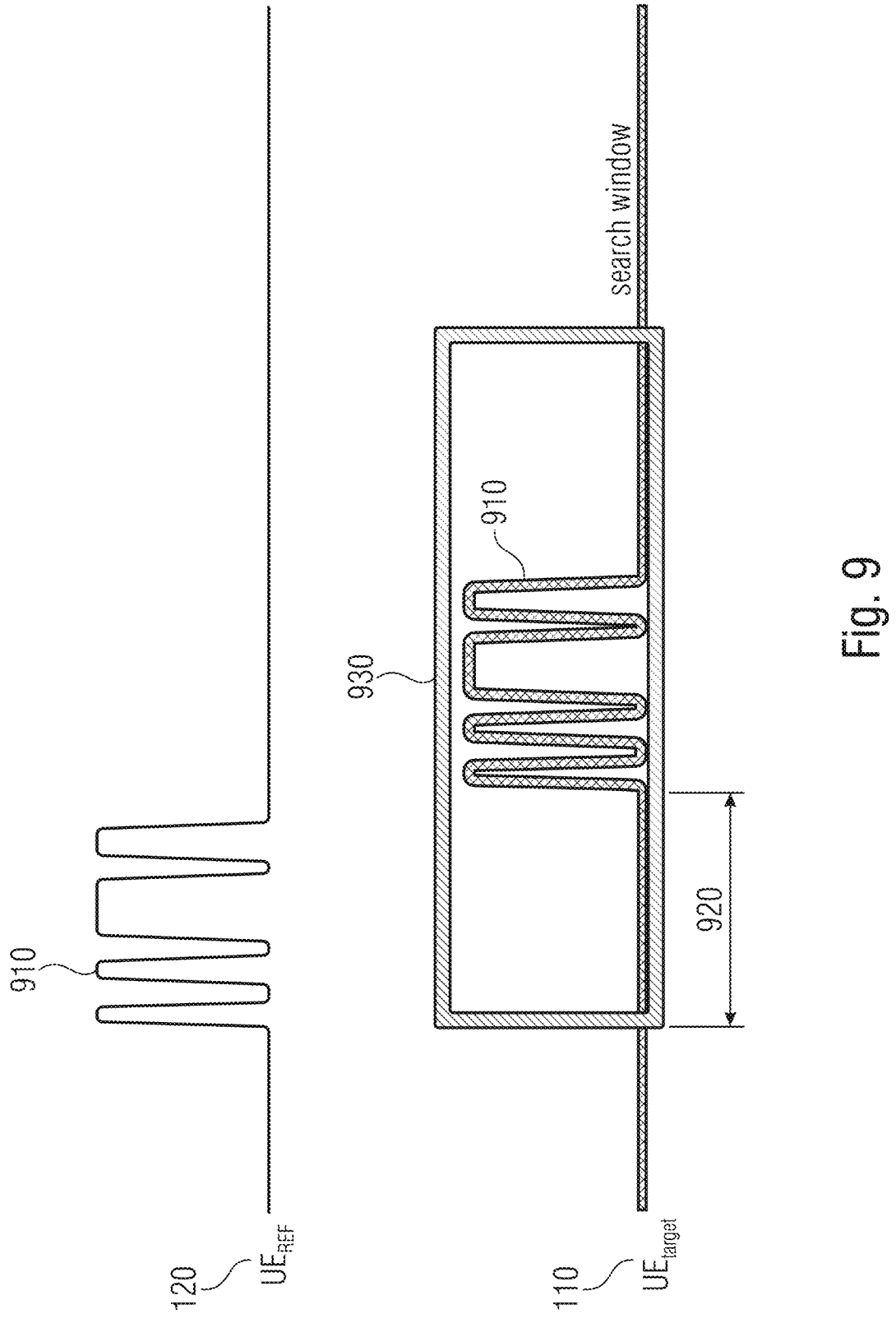
FIG. 9 shows a schematic representation of a search window used by the target device in order to find a reference signal.

FIG. 9 shows the reference signal 910 transmitted by the reference device 120. FIG. 9 further shows the reference signal 910 at the target device 110 in the middle of a search window 930. FIG. 9 further shows a time shift 920 between the reference signal 910 at the reference device 120 and the reference signal 910 at target device 110.

A reference device 120 is transmitting a reference signal 910 and a target device 110 is receiving the reference signal 910 with a time shift 920. The base station 130 or the location server 440 assists the target device 110 to efficiently find the transmitted signal of the chosen reference device 310. By providing the timing of the search window. The search window value and the uncertainty of window size are determined by the base station 130 or the location server 440 based on: the timing advance information, the maximum frequency offset between both devices, the maximum timing misalignment between both devices and the base station or the location server and the time needed between the transmission from the reference device and the reception at the target device. In the proposed scenario, the base station or the location server informs the target device for example over LPP protocol with, for example, the signaling shown in FIG. 9 or 10 about the time of the first schedule transmission of a reference signal of a reference device.

Figure 10:
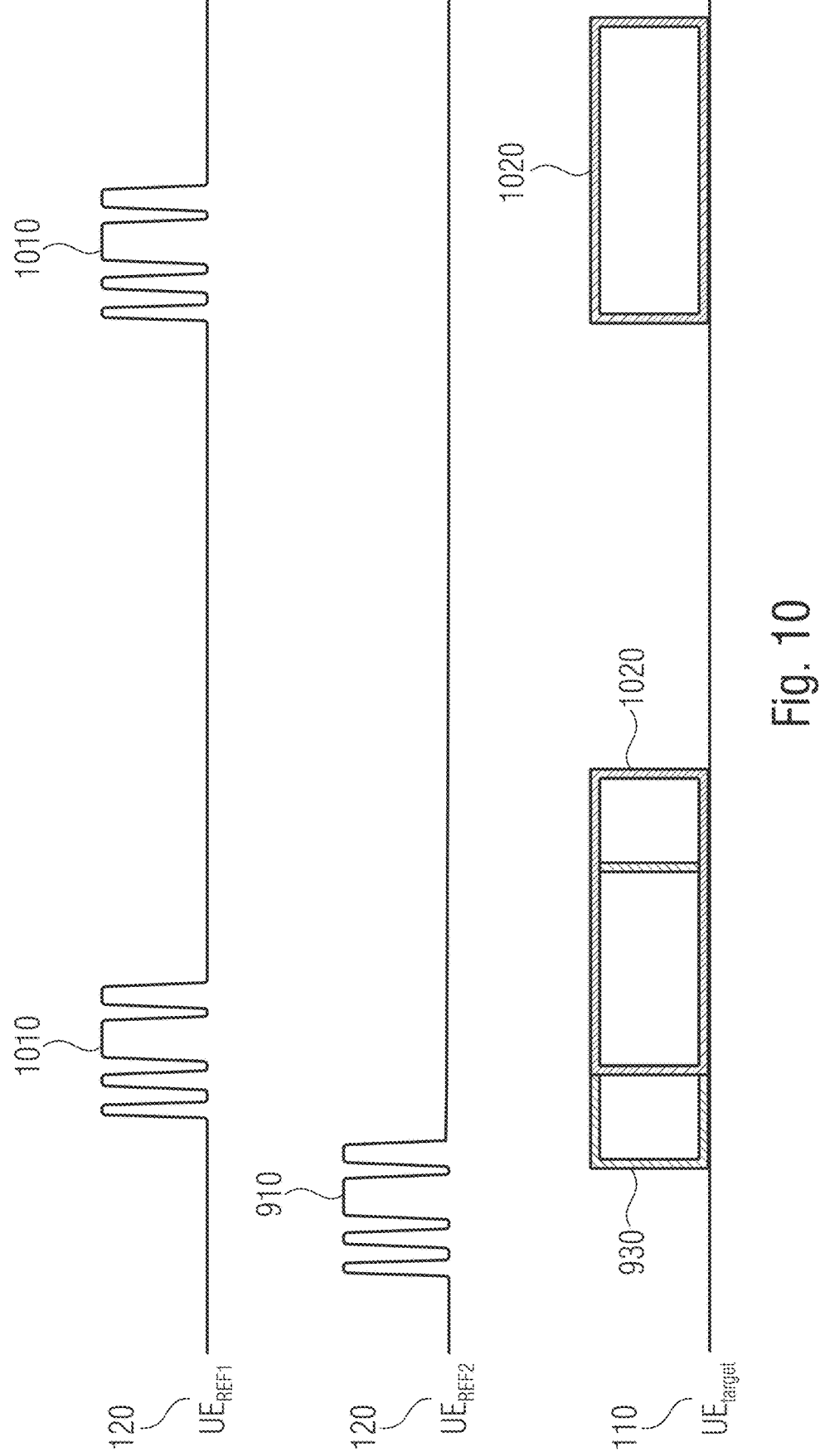
FIG. 10 shows a schematic representation of a search window used by the target device in order to find more than one reference signal.

FIG. 10 shows reference signals 910 transmitted by the reference devices 120 and search windows 930 and 1020 at the target devices. The first reference device 120 is transmitting a periodical reference signal 1010. The second reference device transmits a single reference signal 910. The target device 110 use a search window 930 for finding or expecting the single reference signal 910, and the search windows 1020 for finding or expecting the periodical reference signal 1010.

FIG. 10 illustrates a further use case for the search window 930. In this case, we have two reference devices 120 and one target device 110. The first reference device 120 is transmitting the periodical signal 1010 and the second reference device 120 transmits a single reference signal 910.

The base station 130 or the location server 440 assists the target device 110 to efficiently find the transmitted signals 910 or 1010 of the reference devices 120 by not only providing information about the timing of the search window 930, but providing information about the periodicity of the first reference signal and the timing information of the first reference signal relative to the second reference signal. In case the reference signal is periodic or preconfigured, the target device 110 uses for example, the period information, frame ID and the pattern to track the next bursts of reference signals as shown with the red search windows 1020 in FIG. 10. After successful detection and with the help of the information about the periodicity and the timing information relative to other reference signals, the target device can chose a shorter search window when predicting the next signal.

Figure 11:
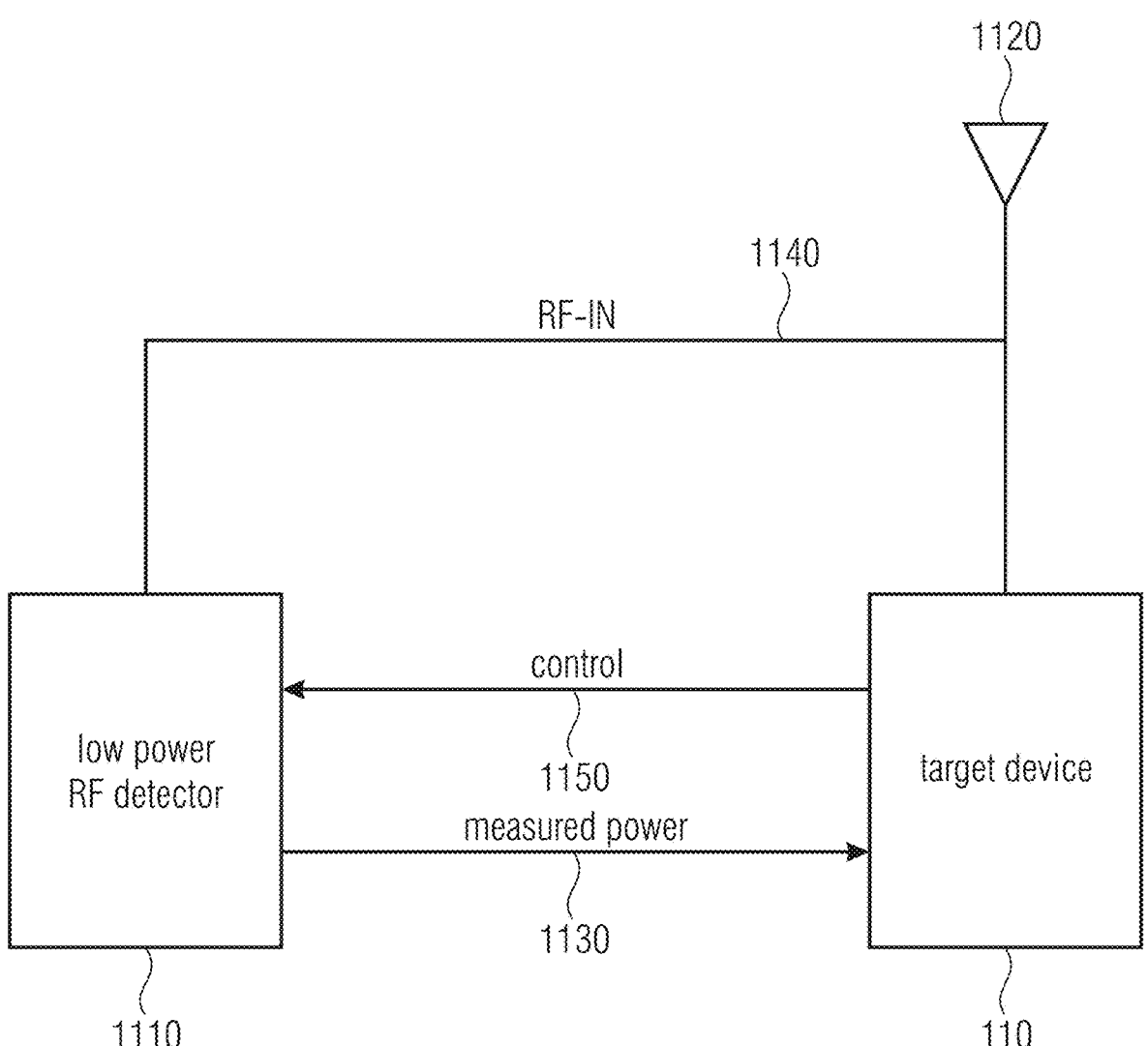
FIG. 11 shows a schematic representation of a target device connected to a separate low power RF detector, according to a further embodiment.

FIG. 11 illustrates an appliance, comprising an antenna 1120, a target device 110 and a low power RF detector 1110. Both, the target device 110 and the low power RF detector 1110, are connected to the antenna 1120. the target device 110 and the low power RF detector 1110 are connected with each other. The target device is able to control 1150 the low power RF detector. The low power RF detector is capable of sending measured values 1130 to the target device 110.

The RF measurement unit 1110 of the target device 110 can be either integrated in the receiving unit of the target device 110 or in the case of the target device 110 does not have a receiving unit, or the operation mode of the receiving unit does not support RF measurements, low power RF detector can be used. FIG. 11 illustrates an example where a target device 110 is connected to a low power RF detector 1110 in order to perform RF measurements. The measurements of the low power RF detector 1110 is controlled 1150 by the target device 110, while the measurement results 1130 are sent back to the target device 110. Both the target device 110 and the low power RF detector 1110 needs to receive RF signals 1140, and are connected to an antenna 1120.

The above described invention is used for enhancing the accuracy of the position calculation of the target device. A more accurate positioning of a mobile target device can be used in the following exemplary use cases:

Massive IoT scenarios

Asset Tracking (Bike theftContainer/Packet tracking)

Localize IoT nodes (Trolley, Industry tools, Key finder, . . . )

The above-described methods or any components may be performed using the computer or a programmable logic device. Thus, each method may be implemented as a program code. The program code being operative for performing one or more of the methods described above when the computer program runs on a computer.

The following program or program-snipplet is an example for an implementation of the method described above:

The variables used in the examples above can be defined for example as it is defined in the following table:

| Sensor NB-Reciever Power Field Description |
| --- |
| timeFirst Window |
| This field provides the reference time associated to the |
| starting position of the first |
| displacement in the displacement list. |
| timeFirstDisplacment |
| This field provides the displacement from timeFirstWindow field. |
| search WindowUncertainty |
| This field provides the search window |
| Period |
| This field provides a the period for the next refernce signal |
| of the same reference node. |
| patternConfig |
| This field provides a predfined config for the trannsmitted patterns |

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

```
RP-AssistantceInformation::= SEQUENCE {
    timeFirstWindow                subframes,
    searchWindowRP                 searchWindowInfoList
}
searchWindowInfoList::= SEQUENCE (SIZE (1..128)) OF search WindowElement
searchWindowElement-r15 ::= SEQUENCE {
    timeFirstWindow      subframes,
    search WindowUncertainty       INTEGER(1..65536),
    period                         INTEGER(1..128)        OPTIONAL,
    patternConfig                  INTEGER(1..8)          OPTIONAL,
    ...
}
```

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

| LIST OF ACRONYMS AND SYMBOLS | |
| --- | --- |
| eNB | Enhanced |
| GNSS | Global Navigation Satellite System |
| LS | Location Server |
| LTE | Long Term Evolution |
| SRS | Sounding Reference Signal |

-continued

| LIST OF ACRONYMS AND SYMBOLS | |
| --- | --- |
| PRS | Positioning Reference Signal |
| PSS | Primary Synchronization Signal |
| SSS | Secondary synchronization signal |
| TP | Transmission Point |
| UE | User Equipment |
| RRC | Radio Resource Control |

REFERENCES

[1] Technical Specification 36.355 3GPP LTE Positioning Protocol (LPP) (Release 13) 3rd Generation Partnership Project, 3rd Generation Partnership Project, 2016

[2] TS 36.331 chapter 14

[3] RF—Detector ADL5506 data sheet.

The invention claimed is:

1. A method for determining the position of a target device within a communication network, comprising:

receiving information about a transmitting time and frequency allocation of a reference device, configured to transmit a reference signal and formed by an internet of things, IOT, device, within the communication network at the target device from a base station or a location server;

expecting a reference signal transmitted by the reference device and performing a radio frequency, RF, measurement by the use of the information, so as to acquire a measurement value dependent on a distance between the target device and the reference device, wherein the target device performs the RF measurement on the expected transmitted reference signal;

wherein the base station or the location server triggers the reference device with a wake-up signal or an extended DRX signal to transmit the reference signal in accordance to said transmitting time; and wherein the method comprises calculating the position of the target device based on the results of the RF measurements.

2. The method according to claim 1, wherein the method comprises a coarse estimation of the target device position, the coarse estimation is performed by a single or multiple base stations or by the location server.

3. The method according to claim 2, wherein the base station or the location server is choosing the reference device from a pool of devices within a detectable range from the target device.

4. The method according to claim 3, wherein the base station or the location server is requesting information about the capabilities and/or the configurations of the target device from the target device and in response to the request the target device is providing the information about the capabilities and the configurations of the target device for the base station or for the location server.

5. The method according to claim 4, wherein the base station or the location server is requesting information about the capabilities and/or the configurations of the reference device from the reference device and in response to the request the reference device is providing the information about the capabilities and the configurations of the reference device for the base station or for the location server.

6. The method according to claim 5, wherein the base station or the location server is informed on a scheduled transmission by the reference device or by the location server or by the base station.

7. The method according to claim 6, wherein the base station or the location server is sending information to the target device about the scheduled transmission and/or a transmitting time and/or a frequency of the chosen reference device.

8. The method according to claim 7, wherein the base station or the location server indicates a search window to find the transmitted reference signal of the reference device, in order to perform the RF measurement.

9. The method according to claim 8, wherein the target device is performing the RF measurement on the transmitted reference signal of the reference device when the reference device is triggered or based on the information about the transmitting time and frequency of the reference device.

10. The method according to claim 9, wherein the RF measurement comprises a receive reference signal strength indication, RSSI, and/or a signal noise ratio, SNR or SNIR, and/or a reference signal received power, RSRP, and/or reference signal received quality, RSRQ, measurement.

11. The method according to claim 10, wherein the base station or the location server is requesting measurement results of the RF measurement from the target device and in response to the request the target device is providing measurement results of the RF measurement to the base station or to the location server; or the target device is reporting measurement results of the RF measurement to the base station or to the location server.

12. The method according to claim 11, wherein the method comprises calculating the position of the target device based on the reported results of the RF measurements at the location server.

13. The method according to claim 12, wherein the base station or the location server allocates and/or deallocates one or more reference devices in time.

14. The method according to claim 1, further comprising triggering the reference device by use of a request for transmission operations.

15. The method for determining the position of a target device within a communication network according to claim 1, comprising:

selecting a reference device, wherein the selecting is performed by a selector of a base station or of a location server;

identifying whether the reference device is available and/or is capable of supporting the target device, wherein the identifying is performed by the location server;

configuring properties and/or properties of period and/or power of the reference device, wherein the configuring is performed by the base station or by the location server; and transmitting information about the reference device to a target device such that the target device can perform an RF measurement by the use of the information, so as to acquire a measurement value dependent on a distance between the target device and the reference device, wherein the transmitting is performed by a transmitter of the base station or of the location server.

16. A reference device configured to transmit a reference signal and formed by an IOT device, in a radio resource control connection mode and/or configured to be triggered on request by a base station or by a location server with a wake-up signal or through an extended discontinuous reception mechanism for transmission operations, in order to provide an opportunity to repeat a transmitted reference signal and/or enhance the ability of a target device to receive the reference signal from the reference device, wherein the transmitted reference signal is configured to be triggered by the base station or by the location server so as to the transmitted reference signal in accordance to a transmitting time; or is configured to be a timely scheduled transmission of the reference device so as to the transmitted reference signal in accordance to a transmitting time.

17. The reference device according to claim 16, comprising a sensor for determining the position of the moving IOT reference device or a stationary IOT device with a known position wherein the position of the IOT reference device determined by the location server or comprising a sensor for determining the position of the moving IOT reference device wherein a sensor information of the is sent to the base station or to the location server.

18. The reference device according to claim 16, comprising a second sensor measuring speed and/or direction, wherein the reference device is configured to send sensor information of the second sensor to the base station or to the location server.

19. A system comprising a base station or a location server, a target device and one or more reference devices configured to transmit a reference signal and formed by an IOT device, in a radio resource control connection mode and/or configured to be triggered on request by a base station or by a location server with a wake-up signal or through an extended discontinuous reception mechanism for transmission operations, in order to provide an opportunity to repeat a reference signal and/or enhance the ability of a target device to receive the reference signal from the reference device, wherein the transmitted reference signal is configured to be triggered by the base station or by the location server so as to the transmitted reference signal in accordance to a transmitting time or is configured to be a timely scheduled transmission of the reference device so as to the transmitted reference signal in accordance to a transmitting time, wherein the system is configured to perform a method determining the position of a target device within a communication network, the method comprising:

receiving information about a transmitting time and frequency allocation of a reference device, formed by an internet of things, IOT, device, within the communication network at the target device from a base station or a location server;

expecting a reference signal transmitted by the reference device and performing a radio frequency, RF, measurement by the use of the information, so as to acquire a measurement value dependent on a distance between the target device and the reference device, wherein the target device performs the RF measurement on the expected transmitted reference signal;

wherein the base station or the location server triggers the reference device to transmit the reference signal; and wherein the method comprises calculating the position of the target device based on the results of the RF measurements.

20. A non-transitory digital storage medium having a computer program stored thereon to perform the method for determining the position of a target device within a communication network, the method comprising:

receiving information about a transmitting time and frequency allocation of a reference device, configured to transmit a reference signal and formed by an internet of things, IOT, device, within the communication network at the target device from a base station or a location server;

expecting a reference signal transmitted by the reference device and performing a radio frequency, RF, measurement by the use of the information, so as to acquire a measurement value dependent on a distance between the target device and the reference device, wherein the target device performs the RF measurement on the expected transmitted reference signal;

wherein the base station or the location server triggers the reference device to transmit the reference signal in accordance to said transmitting time; and wherein the method comprises calculating the position of the target device based on the results of the RF measurements, when said computer program is run by a computer.

\* \* \* \* \*